(No Model.) 6 Sheets—Sheet 1.
W. SPENCE & R. C. THOMPSON.
TRICYCLE.
No. 296,639. Patented Apr. 8, 1884.
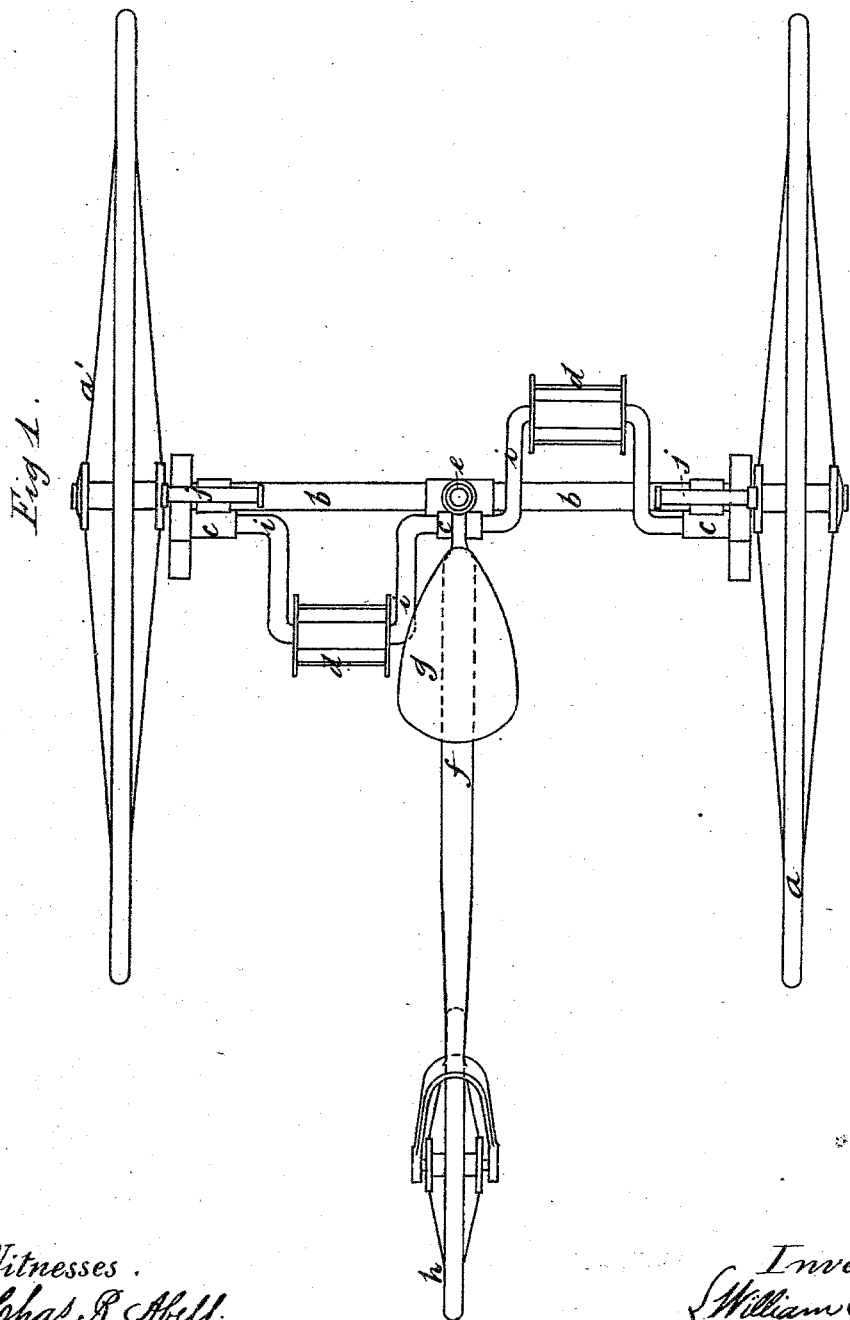

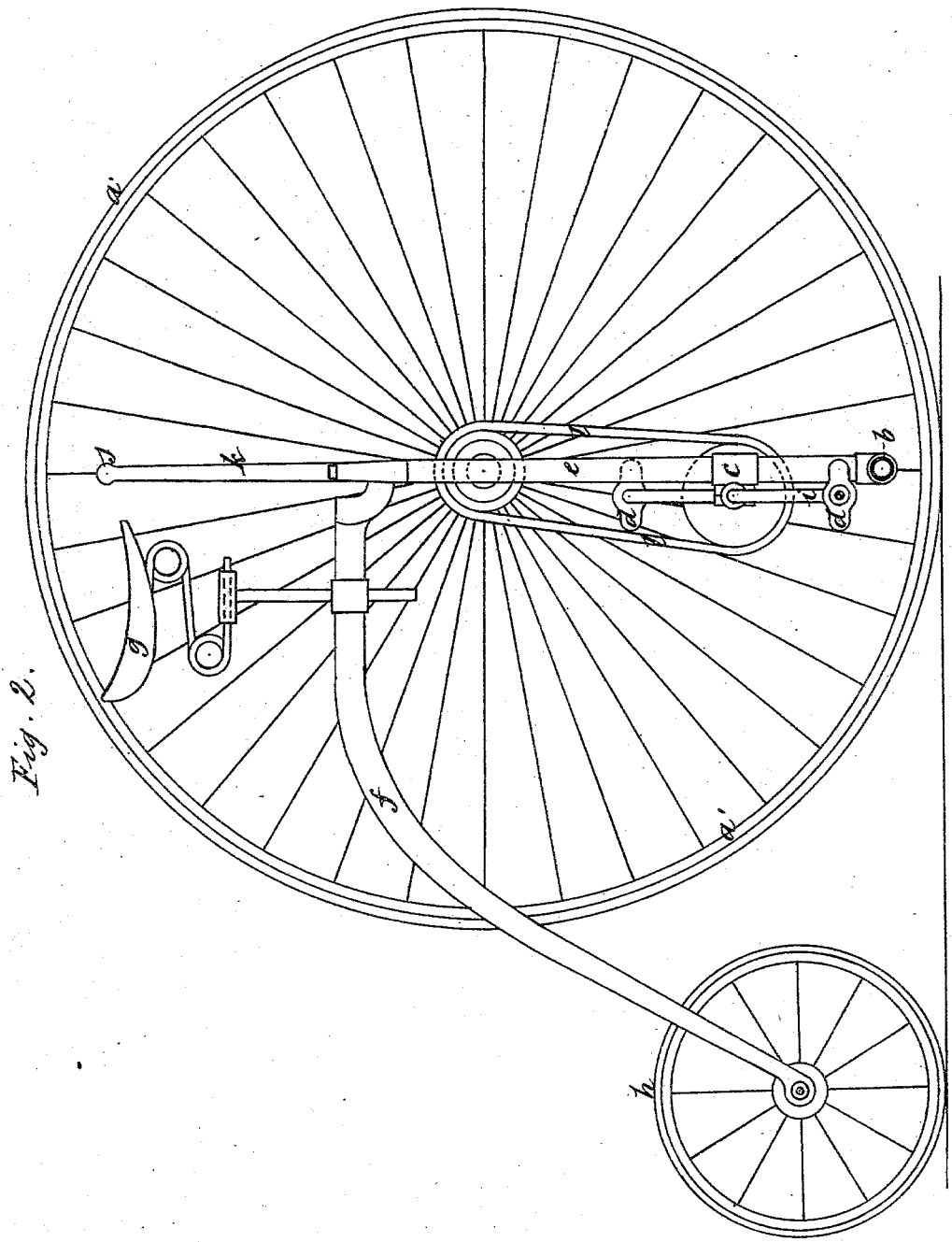

(No Model.) 6 Sheets—Sheet 3.
W. SPENCE & R. C. THOMPSON.
TRICYCLE.
No. 296,639. Patented Apr. 8, 1884.
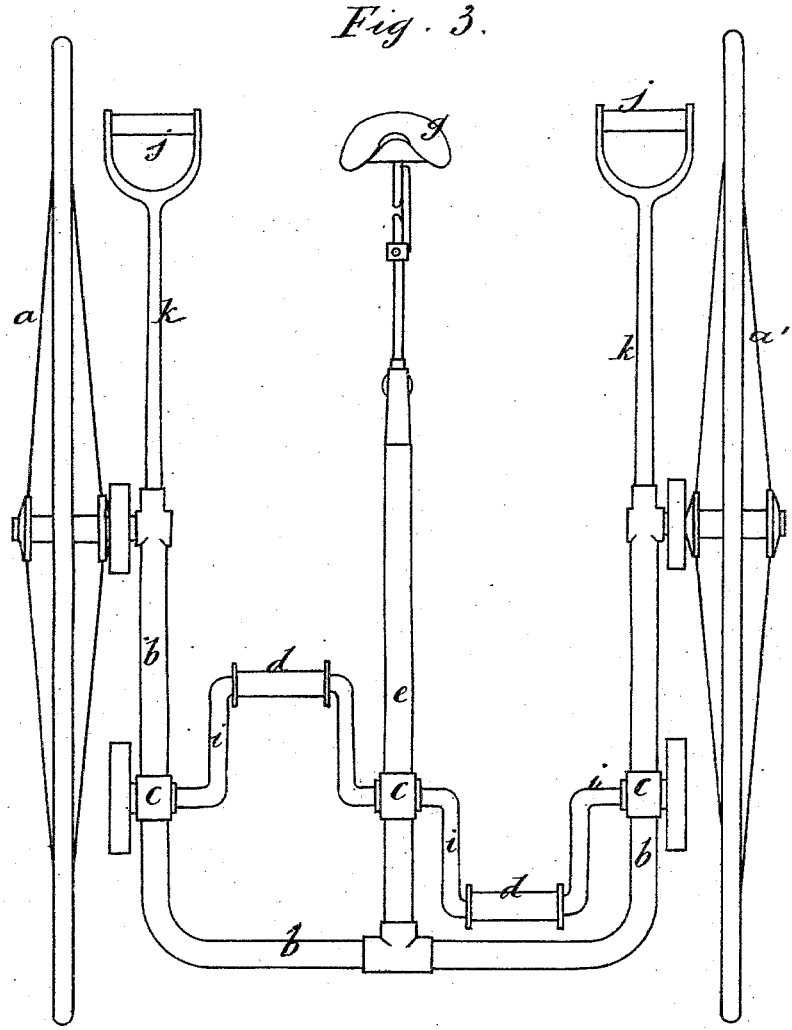
Witnesses.
Chas R. Abell.
N. C. Neumann
Inventors.
William Spence
R. C. Thompson
by John J. Halsted & Son
their Attys.
N. PETERS. Photo-Lithographer. Washington. D. C.

(No Model.) 6 Sheets—Sheet 4.
W. SPENCE & R. C. THOMPSON.
TRICYCLE.
No. 296,639. Patented Apr. 8, 1884.
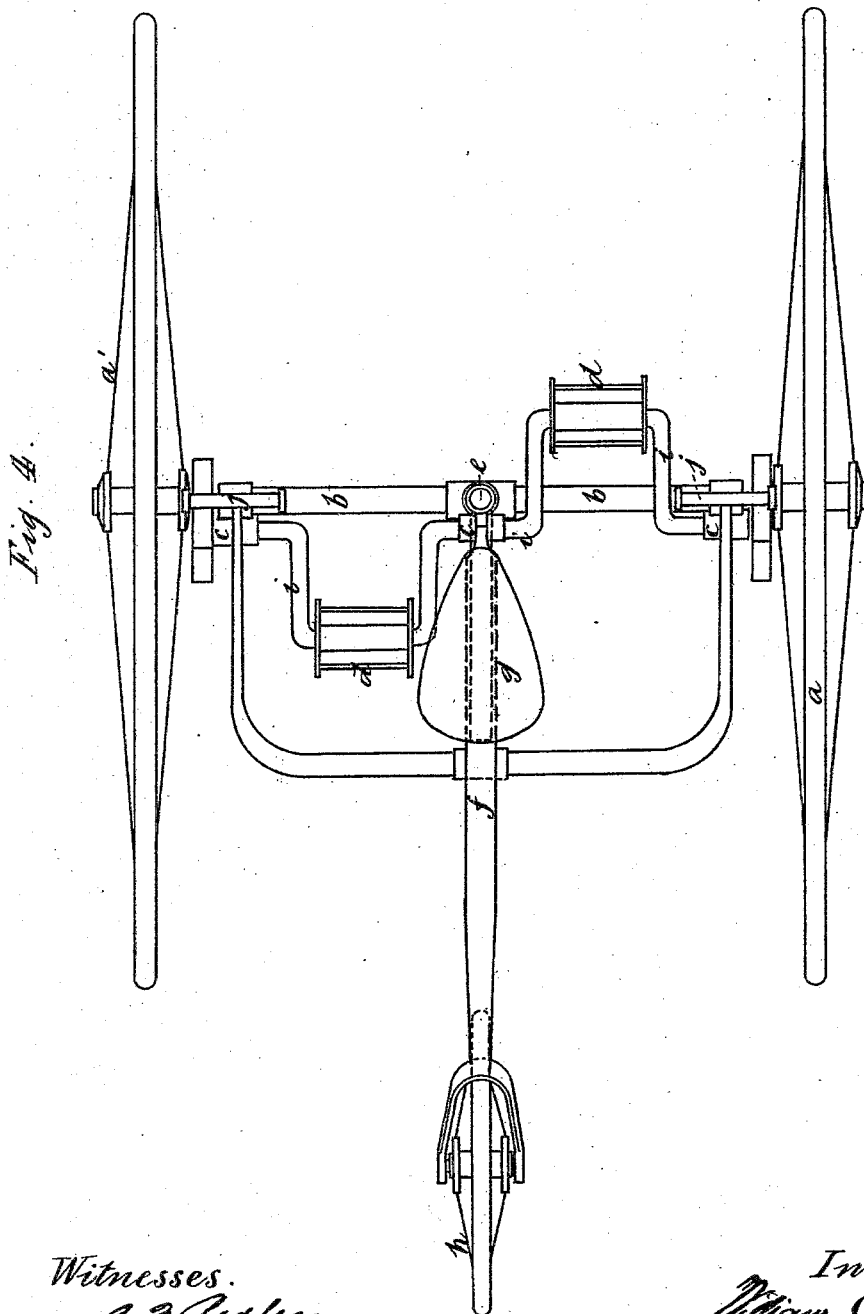

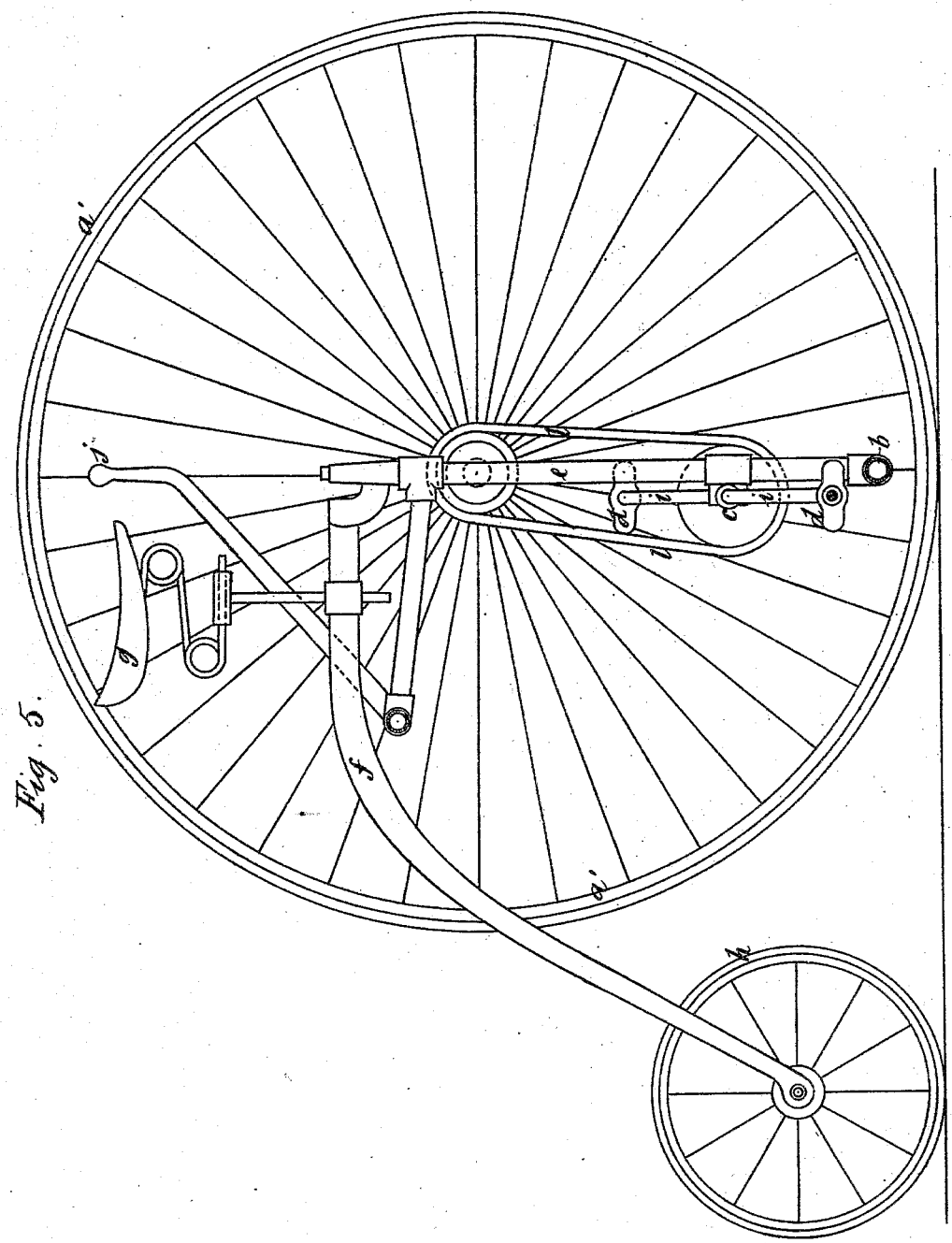

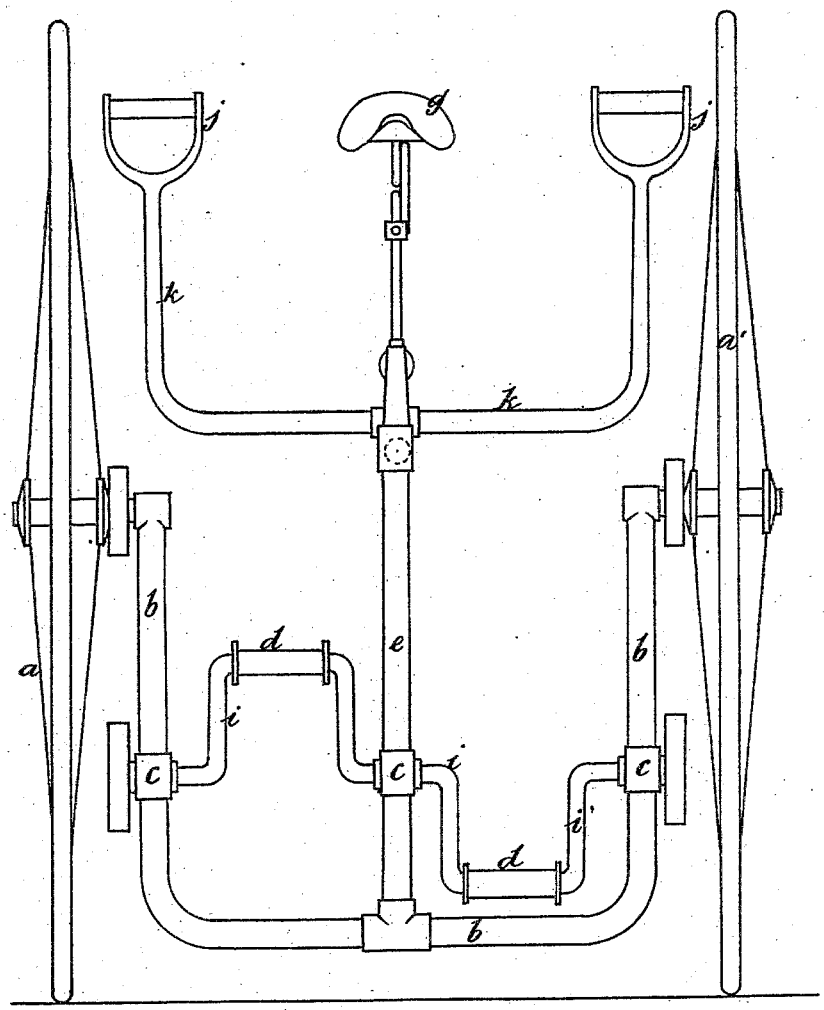

UNITED STATES PATENT OFFICE.

WILLIAM SPENCE, OF SURBITON, AND RICHARD COMINGS THOMPSON, OF BRIXTON RISE, COUNTY OF SURREY, ENGLAND.

TRICYCLE.

SPECIFICATION forming part of Letters Patent No. 296,639, dated April 8, 1884.

Application filed February 27, 1884. (No model.) Patented in England January 23, 1884, No. 1,971.

*To all whom it may concern:*

Be it known that we, WILLIAM SPENCE and RICHARD COMINGS THOMPSON, subjects of the Queen of Great Britain, residing, respectively, at Surbiton and Brixton Rise, both in the county of Surrey, England, have invented new and useful Improvements in Tricycles, (for which we have applied for a patent in Great Britain, No. 1,971, dated January 23, 1884,) of which the following is a specification.

Our invention relates to improvements in tricycles of that class in which the driving-axle is in front of the rider, the saddle being carried upon a backbone pivoted to the steering-frame, as in machines such as those known as the "Humber" and the "Traveller," the object of the invention being to render such tricycles open-fronted, so as to allow the rider a free descent forward, if he desires so to alight, or if he be thrown out of the machine from any cause.

In carrying out our invention, the front or driving wheels, instead of being on a straight transverse axle, run on a cranked axle which extends below the bearings of the pedals, and from the center of which a stem extends upward so as to form a frame of a double U shape. The side uprights are bent outward to receive the driving-wheels, while the backbone is pivoted to the central stem or upright. The pedal crank-shaft is mounted in bearings carried by the three uprights, and drives the main wheels by a pair of endless chains. The steering is effected by means of handles, which may be formed on vertical continuations of the side uprights, or on arms fixed to the central stem and passing under the rider's saddle, and upward on either side. In either case the construction of the main and steering frame is such that an open front is provided for the machine.

In order to enable our invention to be fully understood, we will proceed to describe the same by reference to the accompanying drawings, in which—

Figure 1 is plan, Fig. 2 a sectional side elevation, and Fig. 3 a front view, of a tricycle constructed according to our invention, the steering-handles being formed on vertical continuations of the side uprights of the frame of the machine. Figs. 4, 5, and 6 are similar views to those shown in Figs. 1, 2, and 3, but show the steering-handles formed on arms fixed to the central stem of the frame of the machine.

Similar letters in all the figures represent similar or corresponding parts.

We will first describe our invention by reference to Figs. 1, 2, and 3.

$a$ and $a'$ are the front or driving wheels of the tricycle, which are carried on the axle $b$, cranked in the manner shown in the drawings, the crank extending downward below the bearings $c$ of the pedals $d$.

$e$ is the stem or upright extending upward from the center of the cranked axle $b$, the said cranked axle and stem together forming a frame somewhat of a double U shape, as shown. The upper ends of the vertical side portions of the cranked axle $b$ are bent outward to receive the driving-wheels $a$ and $a'$, and form the "axles," properly so-called, of the driving-wheels.

$f$ is the backbone, pivoted to the central stem or upright, $e$, and carrying the saddle $g$ and small or hind wheel, $h$, as usual. The bearings $c\ c$ of the pedal crank-shaft $i$ are formed on the three uprights of the frame $b\ b$ and $e$, and the driving-wheels $a$ and $a'$ of the machine are driven from the said crank-shaft $i$ by means of a pair of endless chains, $l\ l$, (or their equivalents,) as usual, as shown in Fig. 2 of the drawings.

$j\ j$ are the steering-handles, formed on the vertical continuations $k\ k$ of the side portions of the frame of the tricycle.

In the drawings the side portions of the cranked axle $b$ and the stem $e$ are shown as being placed vertically; but it will be obvious that they may be inclined at any suitable angle toward the hind wheel. By this construction it will be seen that the tricycle, being open at the front, will allow the rider to dismount in a forward direction with facility, if desired, and which arrangement is of great advantage in the event of his being thrown from the machine, as the risk of serious accidents occurring is thereby considerably lessened. The rider is also enabled to sit more directly over the pedals than is the case with open-fronted tricycles at present in use, and the rider's weight is thereby distributed to better advantage between the wheels of the machine.

The tricycle shown in Figs. 4, 5, and 6, is similar in construction to that hereinbefore described, and represented in Figs. 1, 2, and 3, with the exception that, instead of the steering-handles $jj$ being formed on extensions of the side portions of the frame of the machine, they are formed on arms $k\,k$, fixed to the central stem or upright, $e$, which pass under the rider's saddle $g$ and upward on either side of same, as shown.

The steering mechanism may sometimes be so arranged that the small or hind wheel, $h$, will be caused to turn when steering in conjunction with the front or driving wheels, in which case the hind wheel would be pivoted and be connected to the frame in any well-known manner.

A suitable brake is applied to operate either on drums on the driving-wheels, or on the crank-shaft or on any other suitable part of the machine, as usual.

In adapting our improvements to velocipedes or tricycles known as "Sociables," it will be obvious that the seats will be carried by suitable brackets or their equivalents from the backbone or from the central stem of the machine, an additional steering handle or pair of handles being provided.

Having thus described our invention and the manner of performing the same, what we claim is—

1. In a tricycle, the combination, with a backbone carrying the rider's saddle, of a cranked axle placed in front of the rider and open at its front, and extending below the bearings of the pedals, substantially as shown, and for the purposes set forth.

2. In a tricycle, the combination of the cranked axle $b$ for the main or driving wheels, with the steering-handles $j\,j$, and with the central stem or upright, $e$, extending upward from the cranked axle, the combination being and operating substantially as and for the purposes set forth.

3. In a tricycle, the arrangement, in connection with the central stem or upright, $e$, extending upward centrally from the cranked axle, of the steering-handles $j\,j$, formed on or connected to such stem, substantially as herein shown and described.

4. In a tricycle, the combination of the cranked axle $b$, central stem or upright, $e$, steering-handles $j\,j$, and pivoted backbone $f$, all substantially as described and shown.

WILLIAM SPENCE.
R. C. THOMPSON.

Witnesses:
G. F. REDFERN,
A. ALBUTT.